(12) United States Patent
Yoshikawa

(10) Patent No.: US 7,432,915 B2
(45) Date of Patent: Oct. 7, 2008

(54) TOUCH PANEL INPUT DEVICE

(75) Inventor: Osamu Yoshikawa, Tokyo (JP)

(73) Assignee: SMK Corporation, Tokyo (JP)

( * ) Notice: Subject to any disclaimer, the term of this patent is extended or adjusted under 35 U.S.C. 154(b) by 506 days.

(21) Appl. No.: 11/090,509

(22) Filed: Mar. 25, 2005

(65) Prior Publication Data

US 2006/0017705 A1    Jan. 26, 2006

(30) Foreign Application Priority Data

Jul. 26, 2004   (JP) ............................ 2004-217262

(51) Int. Cl.
*G06F 3/041* (2006.01)
(52) U.S. Cl. ...................................... 345/173
(58) Field of Classification Search ................ 345/173, 345/174–178
See application file for complete search history.

(56) References Cited

U.S. PATENT DOCUMENTS

| 5,361,013 | A | 11/1994 | Wiget et al. |
| 2002/0145831 | A1 | 10/2002 | Nakagawa |
| 2003/0067449 | A1 | 4/2003 | Yoshikawa et al. |
| 2005/0253643 | A1 | 11/2005 | Inokawa et al. |

FOREIGN PATENT DOCUMENTS

| EP | 1566728 | 8/2005 |
| GB | 1034768 | 7/1966 |
| JP | 3-6731 U | 1/1991 |
| WO | 2004040430 | 5/2004 |

OTHER PUBLICATIONS

Patent Abstracts of Japan for JP05-053715 published on Mar. 5, 1993.
Patent Abstracts of Japan for JP2003-122507 published on Apr. 25, 2003.
Patent Abstracts of Japan for JP2004-021697 published on Jan. 22, 2004.

*Primary Examiner*—Amr Awad
*Assistant Examiner*—Michael Pervan
(74) *Attorney, Agent, or Firm*—Darby & Darby P.C.

(57) ABSTRACT

The present invention provides a touch panel input device that reliably prevents degradation of a piezoelectric substrate. During inactive periods in which a touch panel input device is not used, the connection between a set of output terminals of an AC power supply circuit and a set of associated drive electrodes on the piezoelectric substrate is switched with a selector switch so that the drive electrodes are shorted. During inactive periods, no DC potential is applied to the set of drive electrodes even if a charged conductive body comes into contact with the drive electrodes or a drive power source pattern connected thereto. This makes it possible to prevent the degradation of the piezoelectric substrate.

2 Claims, 7 Drawing Sheets

TOUCH PANEL INPUT DEVICE

INCORPORATION BY REFERENCE

The present application claims priority under 35 U.S.C. §119 to Japanese Patent Application No. 2004-217262 filed on Jul. 26, 2004. The content of the application is incorporated herein by reference in its entirety.

FIELD OF THE INVENTION

The present invention generally relates to touch panel input devices and more specifically to a touch panel input device that vibrates a touch panel by expanding and contracting a piezoelectric substrate secured to the touch panel and generating an input operation feedback when an input operation is performed.

BACKGROUND OF THE INVENTION

In a touch panel input device, also known as a digitizer, an input operation is performed by using a stylus pen or finger to apply pressure in an operation area set up on the touch panel. The position in the operation area of the input operation is detected and input position data is output to a processing device, e.g., a personal computer, indicating the input operation position.

Examples of methods for detecting the input operation position include a contact method disclosed in Japanese Utility Model Number Hei 3-6731 and a resistance method disclosed in Japanese Laid-Open Patent Publication Number Hei 5-53715. In these methods, there is no clear input operation feedback, e.g., the "click" that is generated when a push-button switch is pressed, when an pressure operation is performed. The operator can only know the operation results from the processing device, e.g., a personal computer, and is therefore unsure about whether or not the input operation to the touch panel has been acknowledged.

The applicants of the present application developed a touch panel input device in which a piezoelectric substrate is secured to the touch panel so that the touch panel can be efficiently vibrated to provide pressure operation feedback to the operator without increasing the size of the entire device (see, e.g., Abstract and FIG. 1 of Japanese Laid-Open Patent Document Number 2003-122507).

FIG. 11 shows a touch panel input device 100 that uses this piezoelectric substrate 120. In this touch panel input device 100, the position of an input operation to a touch panel 101 is detected and input position data is output. A movable plate 101a and a support substrate 101a are stacked while separated by a small gap to form the touch panel 101. Conductor layers formed as uniform resistor films cover the opposing surfaces of the movable plate 101a and the support substrate 101b. By applying pressure to the movable plate 101a, the conductor layers contact each other and provide an electrical connection at the input operation position, thus allowing the detection of the presence and the position of an input operation.

The piezoelectric substrate 120 is a vibrating element that vibrates when the touch panel input device 100 detects an input operation. The piezoelectric substrate 120 vibrates the touch panel 101 by expanding and contracting itself, thus indicating to the operator, via the finger that is touching the touch panel 101, that an input operation has been acknowledged. As shown in FIG. 11, the piezoelectric substrate 120, formed as a long, thin strip, is secured to the back surface of the movable plate 101a. A drive potential output from an AC (alternating current) power supply circuit 110 shown in FIG. 12 is applied to drive electrodes 120a, 120b formed on the front and back surfaces of the piezoelectric substrate 120. When a drive potential in the form of an AC potential waveform of approximately ±100 V (volts) is applied to the drive electrodes 120a, 120b, the piezoelectric substrate 120 flexes in the direction of the thickness axis, indicated by the arrows in FIG. 12, and vibrates the secured touch panel 101 with an amplitude large enough to provide adequate feedback to the finger performing the input operation.

A drive potential in the form of an AC potential waveform of approximately ±100 V must be provided to expand and contract the piezoelectric substrate 120, but the touch panel input device 100 may be installed in a portable device, e.g., a notebook computer, that uses a low-potential DC (direct current) power supply of approximately 5 V. For this reason, the AC power supply circuit 110 requires a step-up circuit to increase the low-potential DC power to a potential of approximately ±100 V and a wave-shaping circuit that shapes a DC potential waveform to an AC potential waveform needed to drive the piezoelectric substrate 120.

FIG. 12 is a block diagram of the AC power supply circuit 110 (see, e.g., sections 0081-0085 and FIG. 7 of Japanese Laid-Open Patent Publication Number 2004-21697). In the AC power supply circuit 110 shown in FIG. 12, a step-up oscillator circuit 111 generates an oscillation of 20 -30 kHz (kilohertz) with a constant-potential DC power supply. A step-up circuit 112 switches the current that flows to a transformer using the cycle of the step-up oscillator circuit 111. The constant-potential DC power of a few volts is stepped up to a DC potential of approximately 100 V and is sent to an amplifier circuit 113.

A vibration oscillator circuit 114 generates a drive signal with a frequency for operating the piezoelectric substrate 120 which is output to the amplifier circuit 113. The amplifier circuit 113 amplifies the drive signal using the DC potential received from the step-up circuit 112 and sends the result to a gate circuit 115.

A pulse width generator circuit 116 is connected to the input side of the gate circuit 115 to generate pulses with time widths for vibrating the piezoelectric substrate 120 when a trigger for vibrating the piezoelectric substrate 120 is received. When this pulse is being received, the gate circuit 115 sends the drive signal received from the amplifier circuit 113 to the drive electrodes 120a, 120b of the piezoelectric substrate 120 to serve as the drive potential.

With this AC power supply 110, the frequency of the drive signal generated by the vibration oscillator circuit 104 and the pulse width generated by the pulse width generator circuit 106 can be set up as desired so that the piezoelectric substrate 120 can be expanded and contracted at different frequencies and intervals. Thus, the touch panel 101 generates vibrations with different sensations for different purposes.

The piezoelectric substrate 120 used as the vibration source in the touch panel 101 is formed as a single-layer substrate made from a piezoelectric material such as a piezoelectric ceramic. The electrostriction properties of this type of ferroelectric body is used to generate warping in the piezoelectric substrate 120, but if a DC field is applied for an extended period, degradation can take place and the piezoelectric constant can decrease. This results in inadequate warping, i.e., vibration in the touch panel 101, even when an AC drive potential is applied.

Also, since the AC power supply circuit 110 is connected to the drive electrodes 120a, 120b of the piezoelectric substrate 120, during the period before the touch panel input device 100 is shipped and during times when the touch panel input device 100 is not being operated, a charge potential stored in the capacitors and stray capacitance in the AC power supply circuit 110 is applied to the drive electrodes 120a, 120b, resulting in the degradation of the piezoelectric substrate 120 due to a DC electric field as described above.

One possible solution is the addition of a selector switch to the conventional touch panel input device 100 that disconnects the piezoelectric substrate 120 from the AC power supply circuit 110 when the touch panel input device 100 is not in use. However, this does not completely solve the problem described above since there is the possibility of a statically charged conductor coming into contact with one of the drive electrodes 120a, 120b of the piezoelectric substrate 120 or with a drive power supply circuit pattern connected to one of the electrodes.

The present invention overcomes the problems of the conventional technology described above and provides a touch panel input device that reliably prevents degradation of the piezoelectric substrate. Also, in the touch panel input device of the present invention, the drive potential generated by the AC power supply circuit is doubled and applied to the piezoelectric substrate to generate a vibration with a greater amplitude while reliably preventing degradation of the piezoelectric substrate when the device is not operating.

SUMMARY OF THE INVENTION

The touch panel input device according to an embodiment of the present invention includes an input detector detecting input operations to a touch panel, a piezoelectric substrate including a set of drive electrodes, a size of the substrate being predetermined with respect to the touch panel, an AC power supply circuit generating a drive potential with a predetermined waveform between a set of output terminals, and a selector switch allowing the drive electrodes of the piezoelectric substrate to be connected to and disconnected from the output terminals of the AC power supply circuit. When an input operation is detected within an operations area, the selector switch connects at least one drive electrode of the piezoelectric substrate to the output terminal so that there is a connection between the set of drive electrodes and the set of output terminals, the touch panel is vibrated by the piezoelectric substrate, which expands and contracts in response to a drive potential applied between the set of drive electrodes, thus providing an input operation sensation to the operator. When the touch panel input device is not operating, the selector switch shorts the set of drive electrodes of the piezoelectric substrate.

If the selector switch is used to short the set of drive electrodes of the piezoelectric substrate when the device is not operating, contact by a statically charged conductor with either one of the drive electrodes does not result in the generation of a DC electric field between the drive electrodes, and there is no deterioration of the piezoelectric substrate.

In the touch panel of the present invention, when an input operation is detecting within an operations area, a selector switch can alternately switch connections between the output terminals and the set of drive electrodes of the piezoelectric substrate near where a drive potential is at zero volts, and a potential double a drive potential generated by the AC power supply circuit can be sent to the set of drive electrodes. When the touch panel input device is not operating, the set of drive electrodes can be connected to one of the output terminal.

By having the selector switch perform zero-cross switching of the connections between the pair of drive electrodes and the pair of output terminals, a potential that is double the potential generated by the AC power supply circuit is applied to the set of drive electrodes. Distortion of the piezoelectric substrate is proportional to the electric field, so a predetermined distortion can be generated even if the DC power supply potential is stepped up to a high potential. This makes it possible to provide vibrations with an amplitude that is sufficient for providing a sensation on the touch panel.

By connecting the set of drive, electrodes to one of the output terminals when the touch panel input device is not being operated, the set of drive electrodes can be shorted and degradation of the piezoelectric substrate can be prevented.

With the touch panel input device of the present invention, the set of drive electrodes of the piezoelectric substrate can be shorted when the touch panel input device is not operation and is not being used. Thus, the piezoelectric constant of the piezoelectric substrate can be prevented from dropping and when the touch panel input device is being used and an input operation is detected, the drive potential can be applied to the piezoelectric substrate and the touch panel can be reliably vibrated.

In addition to these advantages, a selector switch can be used to provide a potential at the set of drive electrodes of the piezoelectric substrate that is twice the drive potential generated at the AC power supply circuit. This allows the set of drive electrodes to be shorted easily when the device is not being operated.

The above, and other objects, features and advantages of the present invention are apparent from the following description read in conjunction with the accompanying drawings, in which like reference numerals designate the same elements.

DETAILED DESCRIPTION OF THE PREFERRED EMBODIMENTS

Figure 1:
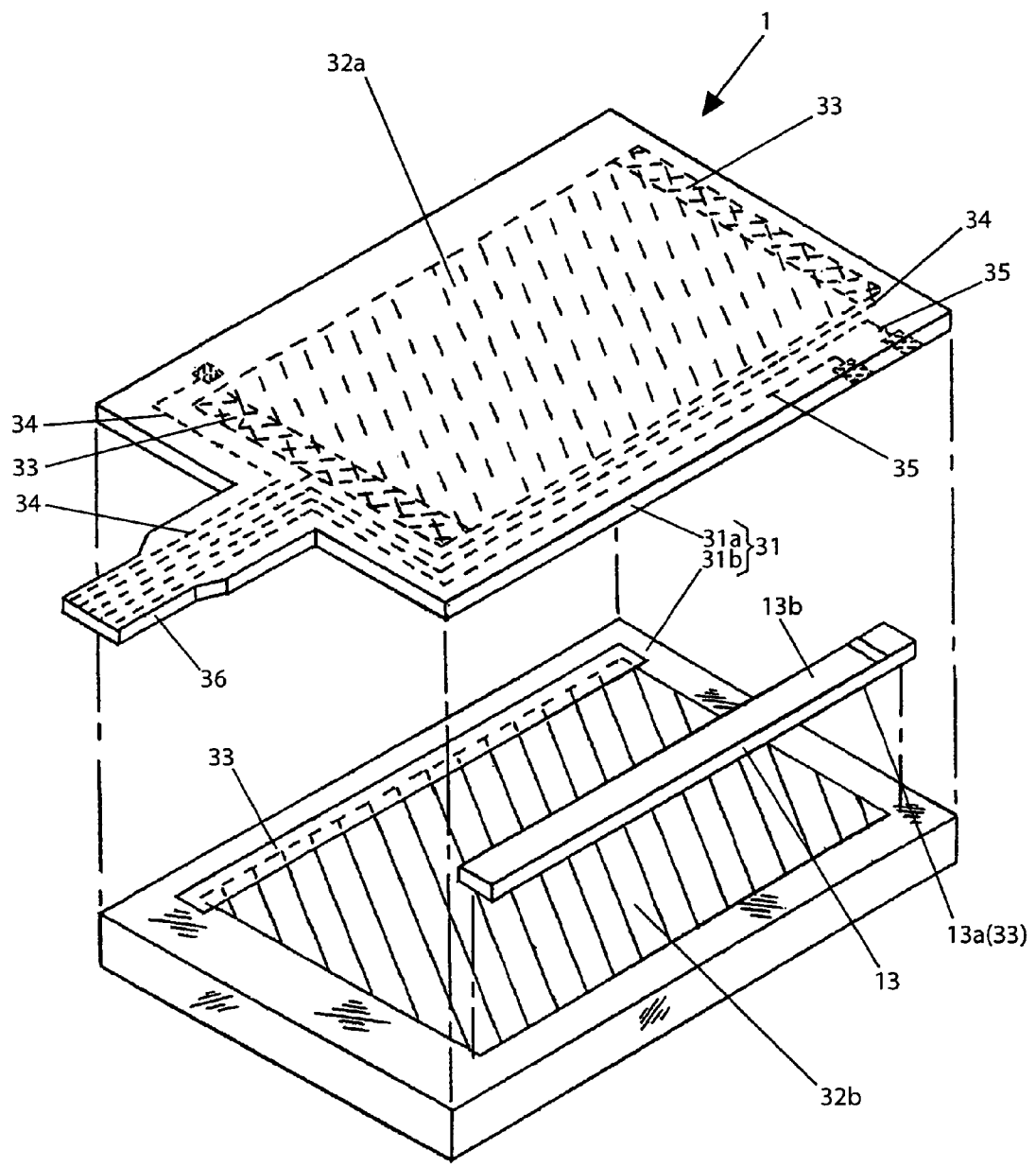
FIG. 1 is an exploded perspective drawing of a touch panel input device according to an embodiment of the present invention.

A touch panel input device 1 according to an embodiment of the present invention will be described, with references to FIGS. 1-4. In the touch panel input device 1 according to this embodiment, a resistance pressure-sensitivity tablet method is used where opposing surfaces of conductive layers are formed as uniform resistor films. The presence and position of an input operation is detected through the contact and contact position of the conductor layers. FIG. 1 is an exploded perspective drawing of the touch panel input device 1 and shows a touch panel 31 formed from a movable plate 31*a* made from PET (polyethylene terephthalate) and a support substrate 31*b* made from a glass substrate.

A movable conductor layer 32*a* and a fixed conductor layer 32*b*, which have identical resistances per unit length, are adhered to opposing surfaces of the movable plate 31*a* and the support substrate 31*b*. Also, lead-out electrodes 33 for generating a predetermined detection potential to the conductor layers 32*a*, 32*b* are disposed on the movable conductor layer 32*a* on the ends as seen from the X axis in the figure and on the fixed conductor layer 32*b* on the ends as seen from the Y axis in the figure. The lead-out electrode on one end of the fixed conductor layer 32*b* also serves as a drive electrode 13*a* of a piezoelectric substrate 13, described later.

The piezoelectric substrate 13, which serves as the vibration source that vibrates the touch panel 31, is secured on the support substrate 31*b* in the gap formed with the movable plate 31*a*. The piezoelectric substrate 13 is a single-layer substrate formed from a piezoelectric material such as polyvinylidene fluoride (PVDF), piezoelectric ceramic, e.g., lead zirconate titanate (PZT) ceramic, or a piezoelectric single crystal. In this example, a piezoelectric ceramic plate formed from a PZT-based piezoelectric ceramic material, which is widely used and has good mechanical endurance, is used. As shown in the figure, the substrate 13 is formed as a thin plate shaped as a long, thin strip extending along a side of the fixed conductor layer 32*b*. By forming the piezoelectric substrate 13 as a thin plate, greater deformation can be provided with a relatively low drive potential.

The pair of drive electrodes 13*a*, 13*b* used to apply the drive potential to the piezoelectric substrate 13 are adhered to the opposing faces of the piezoelectric substrate 13 by vaporizing or screen-printing a conductive metal. The electrodes are then secured through baking. The first drive electrode 13*a*, which covers the back surface of the piezoelectric substrate 13 is folded over to the front side along the longer side of the piezoelectric substrate 13 and is exposed to the front side facing the movable plate 31*a* while keeping a distance so that there is no contact with the second drive electrode 13*b* covering the front side.

The lead-out electrodes 33 and the drive electrodes 13*a*, 13*b* are respectively connected to the detection conductor pattern 34 and the drive power source pattern 35, which are printed on the back surface of the movable plate 31*a*, and are extended out via a connector tail 36. The detection conductor pattern 35 is connected to an input operation detection circuit (not shown in the figure) described later and the drive power supply pattern 35 is connected to the AC power supply circuit 15 by way of a selector switch 2, as shown in FIGS. 2-4.

When the touch panel input device 1 is in a standby mode, the input operation detection circuit applies a predetermined potential as a detection potential to one of layers, e.g., the movable conductor layer 32*a*, grounds the other fixed conductor layer 32*b* by way of a resistor, and monitors the potential. If an input operation is made to the touch panel 31 by pressing the movable plate 31*a* during this standby operation, the movable conductor layer 32*a* and the fixed conductor layer 32*b* come into contact at the input operation position, current flows from the movable conductor layer 32*b* to the resistor, and potential of the fixed conductor layer 32*b* increases to a fixed potential. A predetermined threshold value is set up, and when the potential of the fixed conductor layer 32*b* exceeds this threshold, an input operation to the touch panel 31 is detected.

When the input operation detection circuit detects an input operation, a drive potential is applied from the AC power supply circuit 15 to the drive electrodes 13*a*, 13*b* of the piezoelectric substrate 13 for a predetermined interval. This operation is described below.

For the detection of the input operation position by the input operation detection circuit, the X axis and the Y axis are detected separately. When detecting the input operation position along the X axis, a coordinate detection potential is applied to the first lead-out electrode 33 of the movable conductor layer 32*a*, and the second lead-out electrode 33 is grounded, forming a potential gradient with a uniform slope on the movable conductor layer 32*a*. If the fixed conductor layer 32*b* that comes into contact with the movable conductor layer 32*a* has a high impedance, the potential at the input operation position can be read from the potential of the fixed conductor layer 32*b*. A potential detection circuit such as an A/D converter is connected to the lead-out electrode connected to the fixed conductor layer 32*b* and the potential of the input operation position is read. Since a potential gradient with a uniform slope is formed on the movable conductor layer 32*a*, the potential at the input operation position is proportional to the distance along the X axis. This is used to detect the X coordinate of the input operation position.

The detection of the input operation position along the Y axis is performed in a manner similar to that described above. A potential gradient with a uniform slope is formed along the Y direction of the fixed conductor layer 32*b*, and a potential detection circuit connected to the fixed conductor layer 32*b* by way of the lead-out electrode 33 is used to read the potential at the input operation position. This is used to detect the Y coordinate of the input operation position.

By repeating the X, Y coordinate detection modes described in this manner, the input operation positions on the touch panel 31 can be detected along the X and Y directions, and input position date made up of X coordinates and Y coordinates can be output to a processing device not shown in the figure, e.g., a personal computer.

Figure 2A:
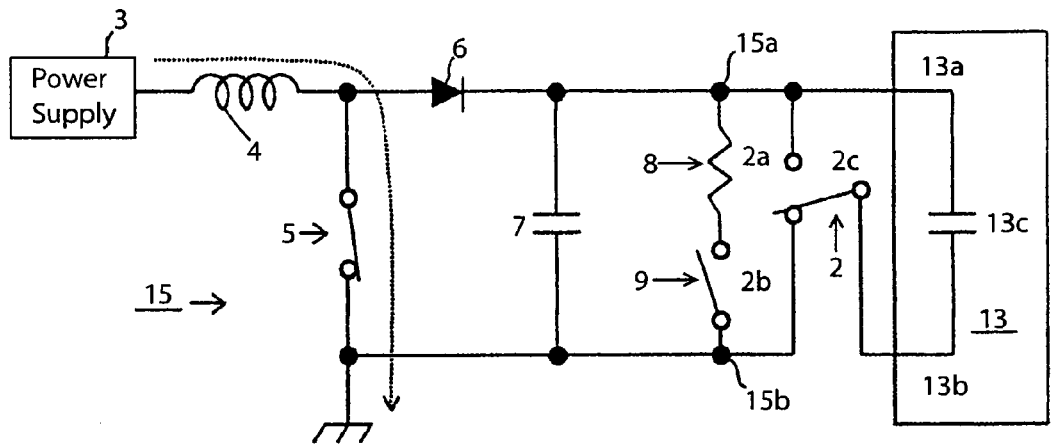
FIGS. 2A and 2B are circuit diagrams of the AC power supply circuit illustrating the principles used by the present invention in forming an upwardly sloping output drive potential that is applied to the piezoelectric substrate when an input operation is detected.
Figure 2B:
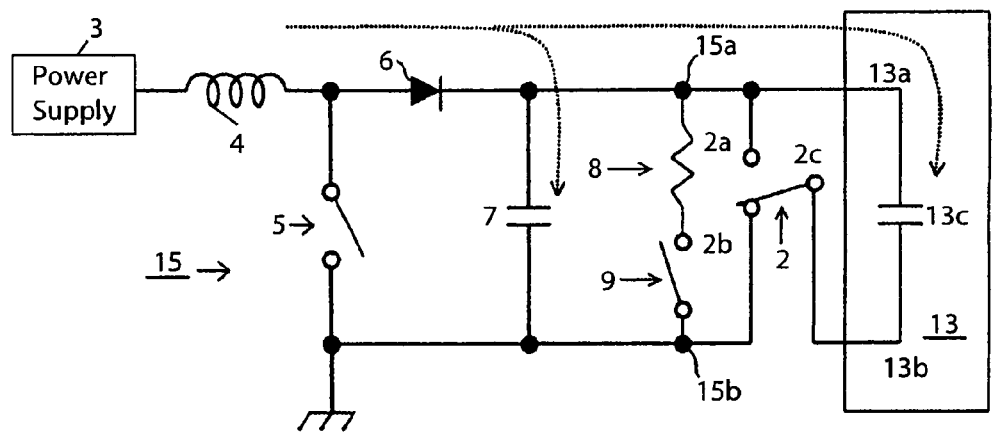
Figure 3:
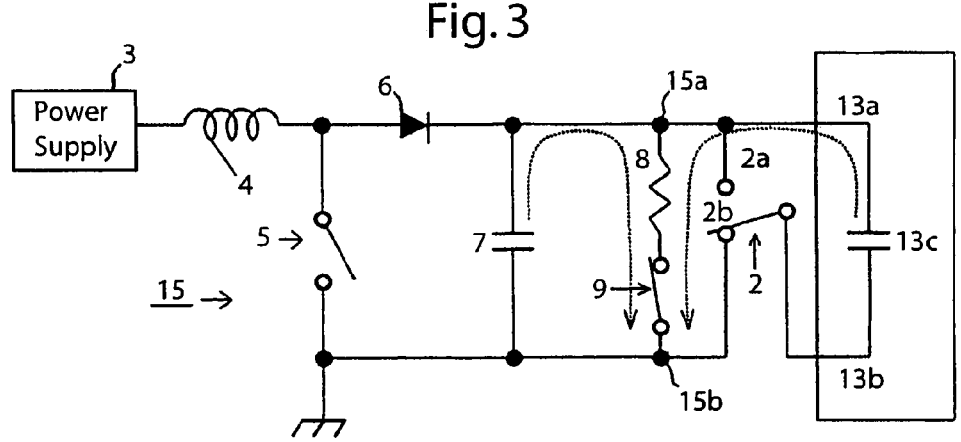
FIG. 3 is a circuit diagram of the AC power supply circuit illustrating the principles used by the present invention in forming a downwardly sloping output drive potential that is applied to the piezoelectric substrate when an input operation is detected.
Figure 4:
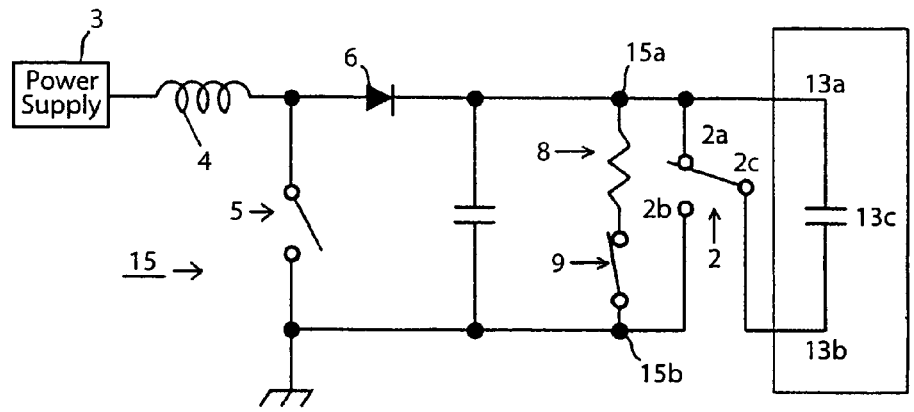
FIG. 4 is a circuit diagram showing the operations of the selector switch of the touch panel input device during a period when there is no activity.

FIGS. 2A, 2B, and 3 are for the purpose of illustrating the operations performed by the AC power supply circuit 15, which applies a drive potential to the piezoelectric substrate 13 when an input operation is detected by the touch panel input device 1 during standby mode. FIGS. 2A and 2B are circuit diagrams that illustrate the operations performed to form an upwardly sloping drive potential between the output terminal 15*a*, 15*b*. FIG. 3 is a circuit diagram for the purpose of illustrating the operations performed to form a downwardly sloping drive potential between the output terminals 15*a*, 15*b*.

These circuit diagrams show a low-potential DC power supply 3 supplying DC power, e.g., of 5 V, a coil 4 serving as an inductor, and a charging switch 5 connected in series with the low-potential DC power supply 3 along with the coil 4. A diode 6 and a capacitor 7 are connected in series, and are in turn connected in parallel with the charging switch 5. The diode 6 serves as a reverse current prevention element and is connected so that the direction from the coil 4 to the capacitor 7 is the forward direction. As described later, when the capacitor 7 is charged, this prevents the reverse flow of discharge current from capacitor 7 to the coil 4 caused by the charge potential.

A discharge resistor 8 and a discharge switch 9 are connected in series to the ends of the capacitor 7. The ends of the discharge resistor 8 and the discharge switch 9, which are connected in series, serve as output terminals 15a, 15b, which connect to the drive electrodes 13a, 13b of the piezoelectric substrate 13.

The discharge switch 9 is kept open if an upwardly sloping drive potential is to be formed. As shown in FIG. 2A, when the charging switch 5 is closed, current flows through the coil 4 in the direction indicated by the arrow in the figure. This current increases as the time elapsed after the closing of the charging switch 5 increases.

When the charging switch 5 is opened after a predetermined amount of time and the current flowing through the coil 4 is stopped, a counterelectromotive force is generated to try to make current continue flowing through the coil 4. The potential of this counterelectromotive force depends on an internal resistance, not shown in the figure, of the piezoelectric substrate 13 connected by way of the diode 6, but as a constant, it is roughly proportional to the "on" time from the closing of the charging switch 5 to its opening. Since the forward direction of the diode 6 is from the coil 4 to the capacitor 7, a charge current flows in the direction of the arrow shown in FIG. 2B, and the capacitor 7 and the internal capacitance 13c of the piezoelectric substrate 13 are charged by the counterelectromotive force generated by the coil 4.

By repeating the opening and closing of the charging switch 5 as described above, each time the charging switch 5 is opened and the current flowing through the coil 4 is stopped, the counterelectromotive force generated by the coil 4 charges the capacitor 7 and the internal capacitance 13c of the piezoelectric substrate 13, and the charge potential is increased from the prior charge potential by the counterelectromotive force. When the charging switch 5 is closed and current flows through the coil 4, the discharge current trying to flow from the capacitor 7 and the internal capacitance 13c of the piezoelectric substrate 13 is stopped by the diode 6 so that the charge potential is maintained.

During one period when the charging switch 5 is closed and then released, the increasing charge potential is roughly identical to the counterelectromotive force generated when the charging switch 5 is released, ignoring the discharge current flowing through the internal resistance of the piezoelectric substrate during this time and the charge potential that already exists. This counterelectromotive force is, as described above, roughly proportional to the "on" time from the closing of the charging switch 5 to the opening.

More specifically, the increase in the charge potential during one period of closing and opening the charging switch 5 is determined by the "on" time during which the charging switch 5 is closed. By repeating this, a desired upward slope in the charge potential can be obtained, and this charge potential can be a desired potential that is stepped up from the low-potential DC power supply 3.

If the charge potential of the capacitor 7 is used as the drive potential, the potential of the low-potential DC power can be increased and a drive potential waveform with a desired upwardly increasing slope can be provided at the output terminals 15a, 15b.

To form a downwardly sloping charge potential, the charging switch 5 is kept open as shown in FIG. 3. From this state, when the discharge switch 9 is closed, as shown in the figure, a discharge current flows in the direction indicated by the arrow through the discharge resistor 8. The charge potential $V_t$ of the capacitor 7 at t hours after the closing of the discharge switch 9 can be expressed as a function of the elapsed time t as follows:

$$V_t = V_o \varepsilon^{-\frac{1}{CR}t}$$

where $V_o$ is the charge potential of the capacitor 7 before closing, C is the sum of the capacitance of the capacitor 7 and the internal capacitance 13c of the piezoelectric substrate 13, and R is the resistance of the discharge resistor 8.

More specifically, the drop in the charge potential is determined by the "on" time during which the discharge switch 9 is closed. By repeating this during a predetermined interval, the downward slope of the charge potential can be changed as desired.

As a result, by opening and closing the charging switch 5 and the discharging switch 9 respectively, upward and downward slopes in the drive potential can be obtained between the output terminals 15a, 15b. By performing these control operations continuously, a drive potential waveform having a desired waveform that has been stepped up from the low-potential DC power supply 3 can be obtained.

The selector switch 2 is connected between the AC power supply circuit 15 and the piezoelectric substrate 13 so that for a predetermined interval following detection of an input operation shown in FIGS. 2 and 3, the set of output terminals 15a, 15b of the AC power supply circuit 15 is connected to the drive corresponding drive electrodes 13a, 13b.

The selector switch 2 selectively connects the common terminal 2c connected to the drive electrode 13b of the piezoelectric substrate 13 to the selector terminals 2a, 2b connected to the output terminals 15a, 15b respectively. The common terminal 2c, shown in FIGS. 2A, 2B, and 3, is switched to the selector terminal 2b connected to the output terminal 15b so that, for a predetermined period after detection of an input operation, the drive potential generated by the AC power supply circuit 15 as described above is applied to the piezoelectric substrate 13 to expand and contract the substrate. The selector switch 2 maintains this selection state even after the input operation to the touch panel 11 is finished, at least while power is supplied to the touch panel input device 1.

During inactive periods when the touch panel input device 1 is not being used, e.g., before the touch panel input device 1 is shipped or while the main power supply of the device in which the touch panel input device 1 is installed is off, the common terminal 2c of the selector switch 2 is switched to the selector terminal 2a, as shown in FIG. 4. The selector terminal 2a is connected to the output terminal 15a and the drive electrode 13b of the piezoelectric substrate 13 so that the drive electrodes 13a, 13b are shorted by way of the selector switch 2.

Thus, during periods of inactivity, no DC potential is applied to the drive electrodes 13a, 13b even if there is unexpected contact of a statically charged conductor to the drive electrodes 13a, 13b or the drive power supply pattern 35 connected thereto. This prevents degradation of the piezoelectric substrate 13.

Next, a touch panel input device 10 according to another embodiment of the present invention is described using FIGS. 5-10. This embodiment has a structure identical to that of the touch panel input device 1 according to the embodiment shown in FIGS. 1-4 except for differences in a selector switch 30 and an AC power supply circuit 20, which generates a drive potential via the operation principles of the AC power supply circuit 15. Overlapping descriptions are omitted. Also, for the circuit elements of the AC power supply circuit 20 operating in a similar manner or identically to circuit elements of the AC power supply circuit 15, identical numerals are assigned and corresponding descriptions are omitted.

As shown in FIGS. 5-9, the AC power supply circuit 20 includes six switches (SW1, SW2, SW3, SW4, SW5, SW6) controlled by control signals output from ports P0, P1, P2, P3 of the controller 21 and pulse control signals output from the PWM output terminal.

Of these, the switch SW2 disposed between the coil 4 and the ground-side electrode 7b of the capacitor 7 corresponds to the charging switch 5, and the switch SW4 disposed between the high-potential side electrode 7a of the capacitor 7 and the ground-side electrode 7b corresponds to the discharge switch 9. When the switch SW1 is closed, the pulse control signal output from the PWM output terminal is received by the switch SW2, which opens and closes based on the pulse control signal as described later. Also, when the switch SW3 is closed, a pulse control signal from the PWM output terminal is received by the switch SW4, which opens and closes in a similar manner.

When a potential waveform is formed, either one or the other of the switch SW1 and the switch SW3 is closed, so that either one of the other of the switch SW2, SW4 is opened or closed by the pulse control signal. The switch not receiving the pulse control signal is kept in an open state. Also, when the switch SW2, SW4 is receiving a pulse in a pulse control signal, the switch is closed and when there is no pulse, the switch is open.

As shown in Table 1, the switch SW1 and the switch SW3 are closed when "H"-level control signals are received from the port P2 and the port P3, and are open when "L"-level control signals are received.

TABLE 1

| | Port Setting | | | | SW Operation | | | | | |
|---|---|---|---|---|---|---|---|---|---|---|
| Phase | P0 | P1 | P2 | P3 | SW1 | SW2 | SW3 | SW4 | SW5 | SW6 |
| 1 | H | L | H | L | ON | PWM | OFF | OFF | 30a | 30b |
| 2 | H | L | H | L | ON | PWM | OFF | OFF | 30a | 30b |
| 3 | H | L | L | H | OFF | OFF | ON | PWM | 30a | 30b |
| 4 | H | L | L | H | OFF | OFF | ON | PWM | 30a | 30b |
| 5 | L | H | H | L | ON | PWM | OFF | OFF | 30b | 30a |
| 6 | L | H | H | L | ON | PWM | OFF | OFF | 30b | 30a |
| 7 | L | H | L | H | OFF | OFF | ON | PWM | 30b | 30a |
| 8 | L | H | L | H | OFF | OFF | ON | PWM | 30b | 30a |
| Inactive Period | L | L | L | L | OFF | OFF | OFF | OFF | 30b | 30b |

The switch SW5 and the switch SW6 are connected between the AC power supply circuit 20 and the piezoelectric substrate 13 and form a selector switch 30, which corresponds to the selector switch 2 in the embodiment of the present invention shown in FIGS. 1-4. More specifically, the common terminal 22a of the switch SW5 is connected to the first drive electrode 13a of the piezoelectric substrate 13 and the common terminal 22b of the switch SW6 is connected to the second drive electrode 13b of the piezoelectric substrate 13. The selector terminals 23a, 23b of the switch SW5, which selects the connection to the common terminal 22a, connects to the output terminals 20a, 20b, which form the output of the AC power supply circuit 20 at the terminals of the capacitor 7. Similarly, the selector terminals 24a, 24b of the switch SW6, which selects the connection to the common terminal 22b, connects to the output terminals 20a, 20b, respectively.

The switch SW5 and the switch SW6 are controlled by control signals from the port P0 and the port P1, respectively. When an "H"-level control signal is received, the common terminals 22a, 22b are switched to the selector terminals 23a, 24a, which are connected to the first output terminal 30a. When an "L"-level control signal is received, the common terminals 22a, 22b are connected to the selector terminals 23b, 24b, which are connected to the second output terminal 30b.

If the drive electrodes 13a, 13b are connected to the output terminals 30a, 30b when the drive potential is applied to the piezoelectric substrate 13, the piezoelectric substrate 13 has a high internal resistance of 10 Mohm-20 Mohm (MΩ) so that, rather than dropping suddenly, the charge potential of the capacitor 7 is forced down to match the desired downward slope of the drive potential waveform by using the switch SW4 and the discharge resistor 8.

To generate a drive potential with a potential sine curve waveform as shown in FIG. 10C in the AC power supply circuit 20, a single waveform period is divided into Phase 1 through Phase 8, and the switch SW1 through the switch SW6 are opened and closed for each individual phase.

The pulse control signal output from the PWM output terminal is a modulated signal modulated by pulse width modulation, where a modulation signal modulates the duty cycle (impulse function), which is the pulse width ratio for one period, for each period. Different pulse modulation signals are assigned to each of Phase 1 through Phase 8. In this example, the frequency of the pulse control signal is 20.80 kHz, and is identical for all phases. For each phase, a unit count is assigned, where one unit is a pulse control signal for two periods, with different lengths being used for each phase. As a result, using these eight phases, a desired potential waveform can be formed.

The duty cycle of the pulse control signal increases or decreases by a fixed proportion for each continuous period, and this increase or decrease is set up for each phase. In other words, by setting up for each phase an initial duty cycle value, an increase or decrease, and a number of continuous units, it is possible to set up more combinations of pulse widths and "off" widths using limited modulating data compared to conventional pulse-width modulation systems where pulse widths are determined for each period of the pulse control signal.

In Phases 1 and 2, a potential waveform is formed going from the zero-cross position of the sine wave potential waveform shown in FIG. 10H to a position slightly exceeding the maximum value. As shown in FIGS. 10A-10D, the ports P0, P2 are set to "H", the ports P1, P3 are set to "L", the switch SW1 is closed, the switch SW3 is opened, the common terminal 22a of the switch SW5 is selected to the selector terminal 23a, and the common terminal 22b is selected to the selector terminal 24b (see FIG. 5).

As a result, the switch SW2 is controlled by the pulse control signal from the PWM output terminal while the connection between the discharge resistor 8 and the capacitor 7 is opened, and the capacitor 7 is charged each time the switch SW2 is opened and closed.

The pulse control signal output in Phase 1 has a length of 21 units. More specifically, since the length of one unit is 96 microseconds, the total length is approximately 2 milliseconds (msec). As a result, the pulse width and pulse "off" width of the pulse control signal for each period are set up so that the charge potential of the capacitor 7 traces the increase from the zero-cross position to the maximum position of a sine wave curve.

The terminals of the capacitor 7 are connected to the output terminals 22a, 22b connected to the piezoelectric substrate 13. As a result, discharge current is always flowing and trying to lower itself through the internal resistance of the piezoelectric substrate 13, including the periods when charging is taking place repeatedly (this downward reduction is referred to as natural discharge). If an identical counterelectromotive force is generated in the coil 4, the increase in the charge potential is dependent on the charge potential. Although increases can take place easily while the charge potential is low, they become more difficult as the charge potential increases.

As a result, for the charge potential waveform to be an upwardly sloping sine wave, a pulse control signal with a small duty cycle is used to provide a short on time for the switch SW2 when the charge potential is low. As the charge potential increases, the duty cycle must be gradually increased and the on time for the switch SW2 must be made longer so that the generated counterelectromotive force is increased. With the pulse control signal output in Phase 1, the duty cycle in one period is increased at a fixed proportion relative to the duty cycle from the immediately prior period, as shown in detail in FIG. 10E1.

By repeating, during Phase 1, the charging operation with the pulse control signal, at the end of Phase 1 a charge potential of +100 V is achieved between the high potential side electrode 7a and the ground-side electrode 7b of the capacitor 7, as shown in FIG. 10G.

In Phase 2, a pulse control signal that is 7 units long in this example is output so that the charge potential waveform of the capacitor 7 forms a path from the maximum value of a sine waveform to a position where the slope is identical to the slope of natural discharge. More specifically, during this interval the charge potential drops due to natural discharge but the waveform of the charge potential lowered by natural discharge is lower than the waveform of a charge potential forming a continuous sine wave from the maximum value. Therefore, the switch SW2 is controlled by the pulse control signal to repeatedly charge the capacitor 7 and to obtain a charge potential that matches a sine wave.

Thus, in Phase 2, the duty cycle for the first period is roughly identical to the duty cycle for the last period of Phase 1. Each duty cycle is reduced by a fixed proportion from the duty cycle of the previous period so that the duty cycle of the final period roughly converges to 0% (see FIG. 10E1).

In Phases 3 and 4, the potential waveform of the charge potential forms a path from a position on the sine wave potential waveform shown in FIG. 10H where the slope matches the slope of the natural discharge to the zero-cross position. From the control signal states in Phases 1 and 2, the port P3 is set to "H", the port P2 is set to "L", and, as shown in FIG. 4, the switch SW1 is opened and the switch SW3 is closed.

As a result, the switch SW2 is disconnected from the PWM output terminal and the SW4 is controlled by the pulse control signal output. When the pulses of the pulse control signal is received, the charge potential of the capacitor 7 drops due to the discharge current flowing through the discharge resistor 8.

During this Phase 3 and 4 interval, the charge potential for forming a sine wave is lower than the charge potential lowered by natural discharge. Therefore, while the discharge resistor 8 is controlled by the pulse control signal, the charge potential of the capacitor 7 is lowered by the discharge current flowing through the discharge resistor 8.

During Phase 3, pulse control signals that are 7 units long in this example are sent to the switch SW4 so that the charge potential waveform of the capacitor 7 starts from a position on the sine waveform where the slope matches that of the natural discharge (the endpoint of Phase 2) and continuously approximates the sine wave waveform. If the discharge resistor 8 is connected in parallel to the capacitor 7 and the charge potential of the capacitor 7 is to be lowered, the charge potential drops easily when the charge potential is high but less easily when the charge potential is low, which is opposite from when charging takes place. Thus, the pulse control signal in Phase 3 has a duty cycle of 0% for the first period and the duty cycle increases by a fixed proportion up to the last period in Phase 3 (see FIG. 10F1).

When the Phase 3 pulse control signals repeatedly perform discharging operations and the charge potential is lowered to a certain port, the charge potential tends not to drop as easily. The pulse control signals in Phase 4 have a duty cycle for the first period that is 40% greater than the pulse control signals in Phase 3. This duty cycle is increased by a fixed proportion up to the final period, which is formed by 9 units (see FIG. 10F1).

When the discharge operations controlled by the pulse control signals in Phase 4 are completed, the charge potential of the capacitor has dropped to approximately 0 V. As a result, a potential waveform is formed between the terminals of the capacitor 7 that approximates a half wave of a sine waveform, as shown in FIG. 10G. The common terminal (output terminal) 22a of the switch SW5 is connected to the selector terminal 23a, and the common terminal (output terminal) 22b of the switch SW6 is connected to the selector terminal 24b. Since the selector terminal 24b is grounded, a potential waveform that is a half wave of a sine wave is applied to the drive electrodes 13a, 13b, with the drive electrode 13a being the "plus" side.

With the method described above, the charge potential of the capacitor 7 can be used to increase a low DC potential and to set the slope of potential increases and decreases as desired. Thus, the charge potential can be used directly as the output potential to provide a desired output potential waveform with a high potential. In this embodiment, a charge potential identical to the charge potential in Phase 1 through Phase 4 is formed from Phase 5 through Phase 8 between the output terminals 20a, 20b. By using the switches SW5, SW6 of the switch 30 to switch between the output terminals 20a, 20b and the drive electrodes 13a, 13b, an output potential is formed between the drive electrodes 13a, 13b that is identical to the drive potential generated by the AC power supply circuit 20 but with reversed polarity, providing an output potential that is twice that of the charge potential of the capacitor 7.

Figure 5:
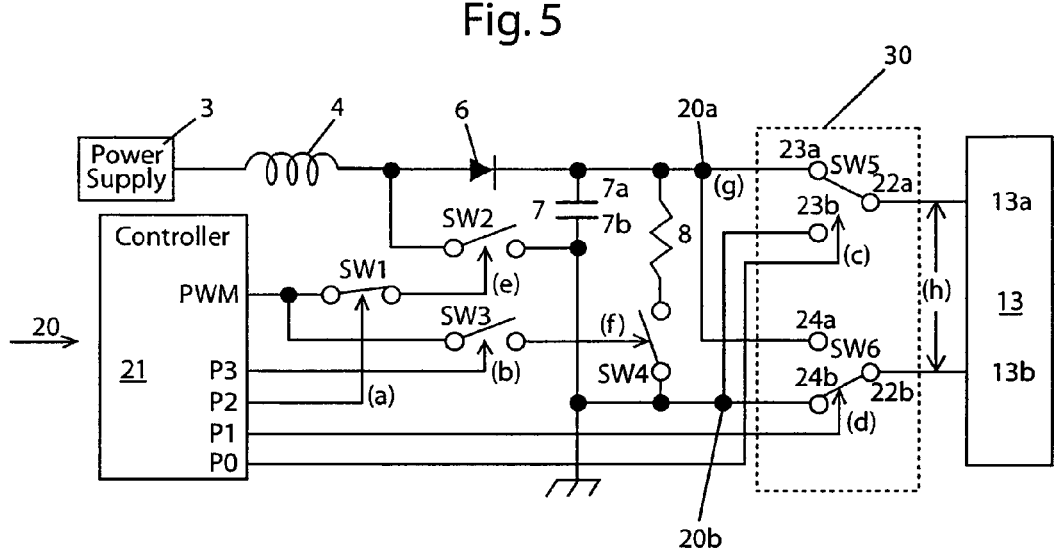
FIG. 5 is a circuit diagram of the AC power supply circuit illustrating the operation of the switches SW in the wave-shaping circuit in Phase 1 and Phase 2 when an input operation is detected.
Figure 6:
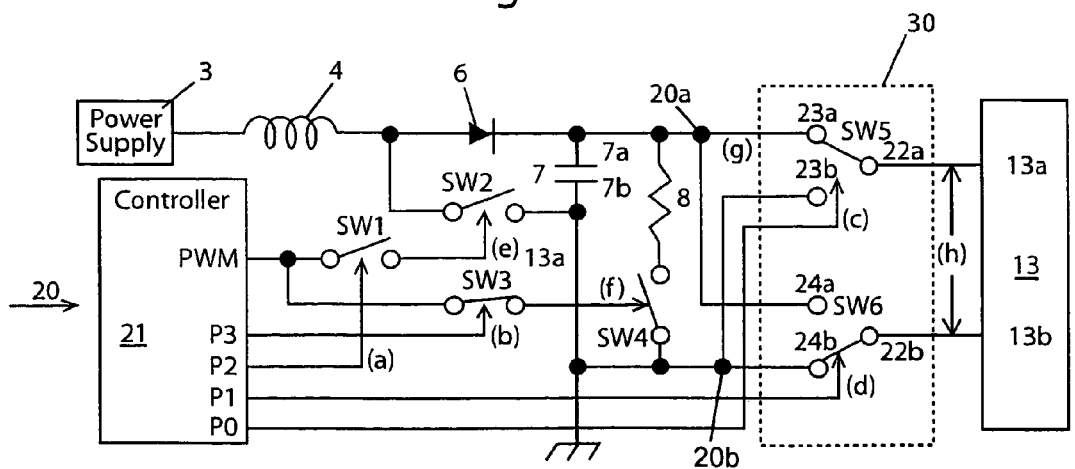
FIG. 6 is a circuit diagram of the AC power supply circuit illustrating the operation of the switches SW in the wave-shaping circuit in Phase 3 and Phase 4 when an input operation is detected.
Figure 7:
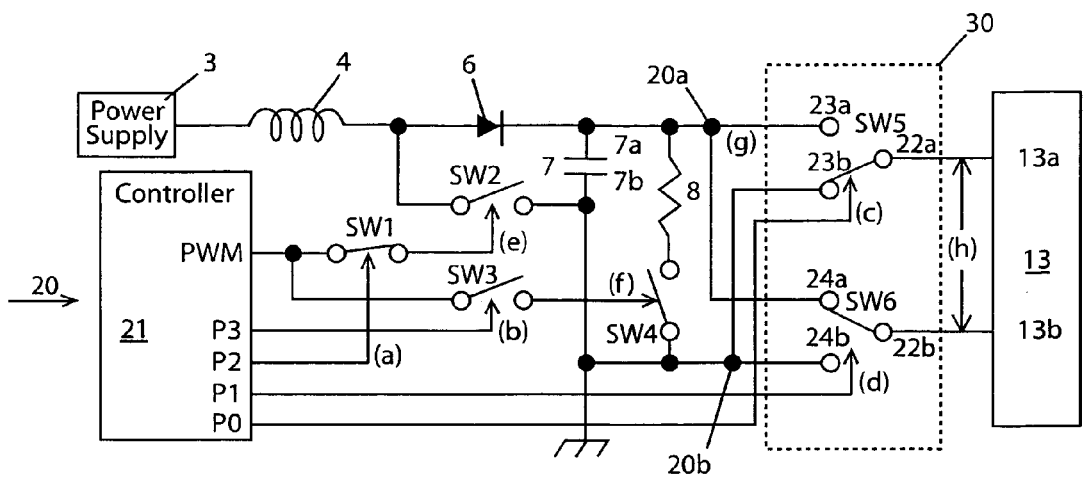
FIG. 7 is a circuit diagram of the AC power supply circuit illustrating the operation of the switches SW in the wave-shaping circuit in Phase 5 and Phase 6 when an input operation is detected.
Figure 8:
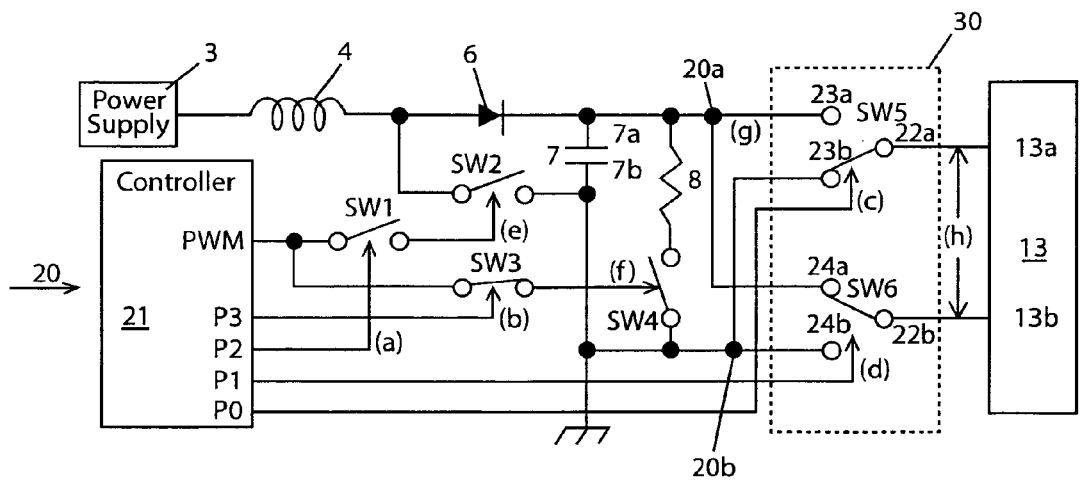
FIG. 8 is a circuit diagram of the AC power supply circuit illustrating the operation of the switches SW in the wave-shaping circuit in Phase 7 and Phase 8 when an input operation is detected.

More specifically, from Phase 5 to Phase 8, the port P0 is set to "L" and the port P1 is set to "H" based on the control signal outputs from Phases 1-4, as shown in FIGS. 10C and 10D. As shown in FIGS. 5 and 6, the common terminal 22a of the switch SW5 is switched to the selector terminal 23b and the common terminal 22b of the switch SW6 is switched to the selector terminal 24a.

With regard to the behavior of the control signal for the switches SW and the pulse control signal from the PWM output terminal, Phase 5 is identical to Phase 1, Phase 6 is identical to Phase 2, Phase 7 is identical to Phase 3, and the Phase 8 is identical to Phase 4. As a result, from Phase 5 through Phase 8, a potential waveform that is a half wave of a sine waveform identical to Phase 1 through Phase 4 is formed between the terminals 7a, 7b of the capacitor 7, as shown in FIG. 10G.

As a result, a half wave of a sine waveform where the drive electrode 13a is the "minus" side is formed as the output potential at the drive electrodes 13a, 13b (common terminals 22a, 22b). By making this continuous with the output potential formed from Phase 1 through Phase 4, a ±100 V sine wave drive potential is applied to the piezoelectric substrate 13.

The piezoelectric substrate 13 expands and contracts with the drive power source being the ±100 V sine wave drive potential, resulting in the vibration of the secured touch panel 31. Furthermore, by repeating Phases 1-8, a sine wave drive potential oscillating for a desired period can be obtained, and the touch panel 31 can be vibrated during this period.

Similarly, the number of phases forming one waveform, the pulse control signals output for each phase, and the control signals for the switches SW can be adjusted as desired to form various drive potential waveforms using the same AC power supply circuit 20.

Figure 9:
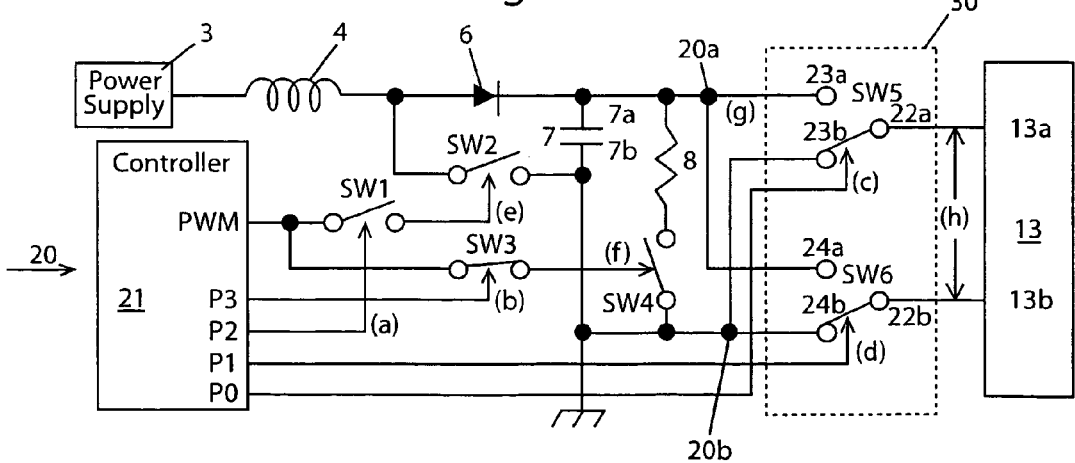
FIG. 9 is a circuit diagram illustrating the operation of the selector switch when the device is not active.
Figure 10:
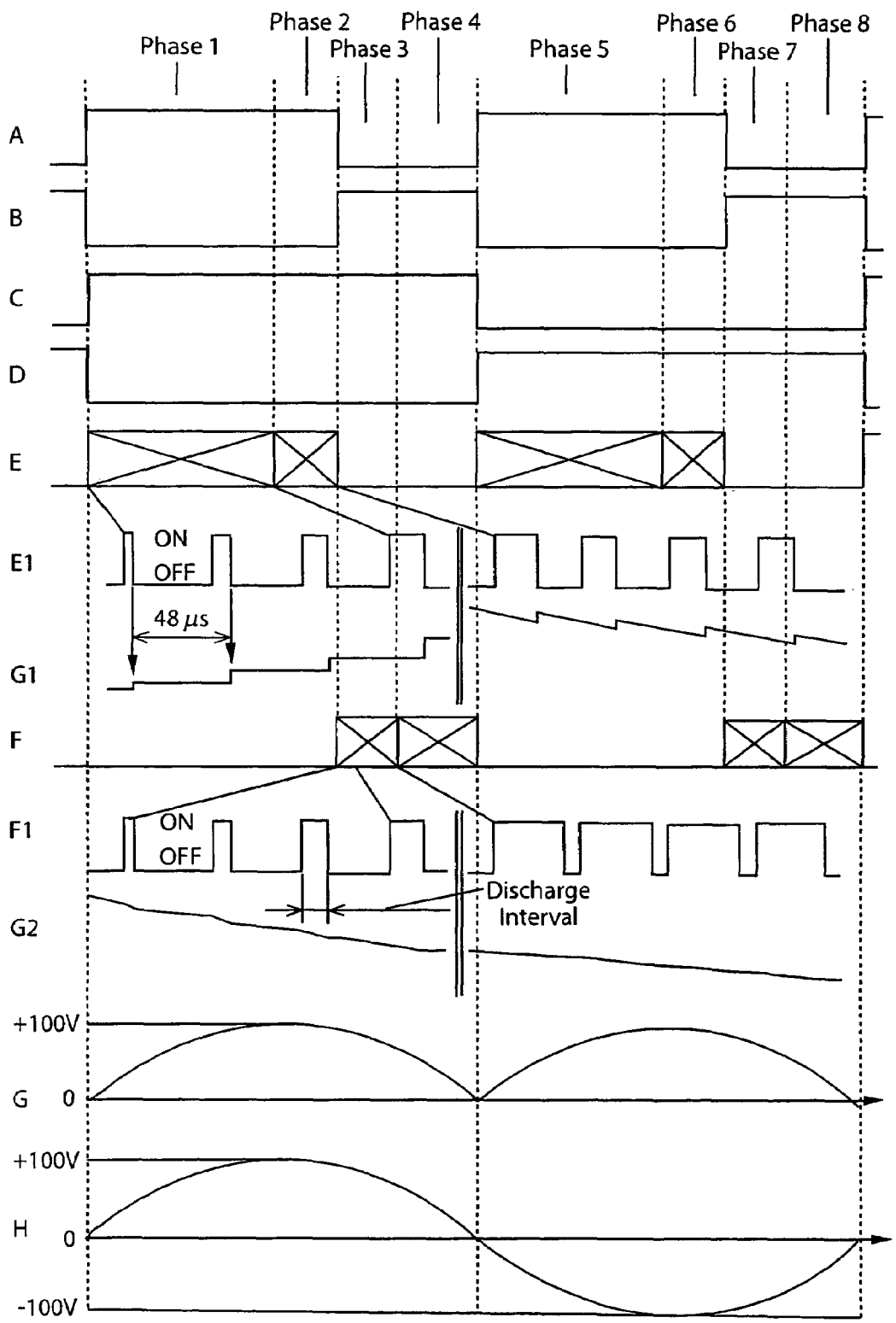
FIGS. 10A-10H are waveform diagrams of the AC power supply circuit from Phases 1-8.
Figure 11:
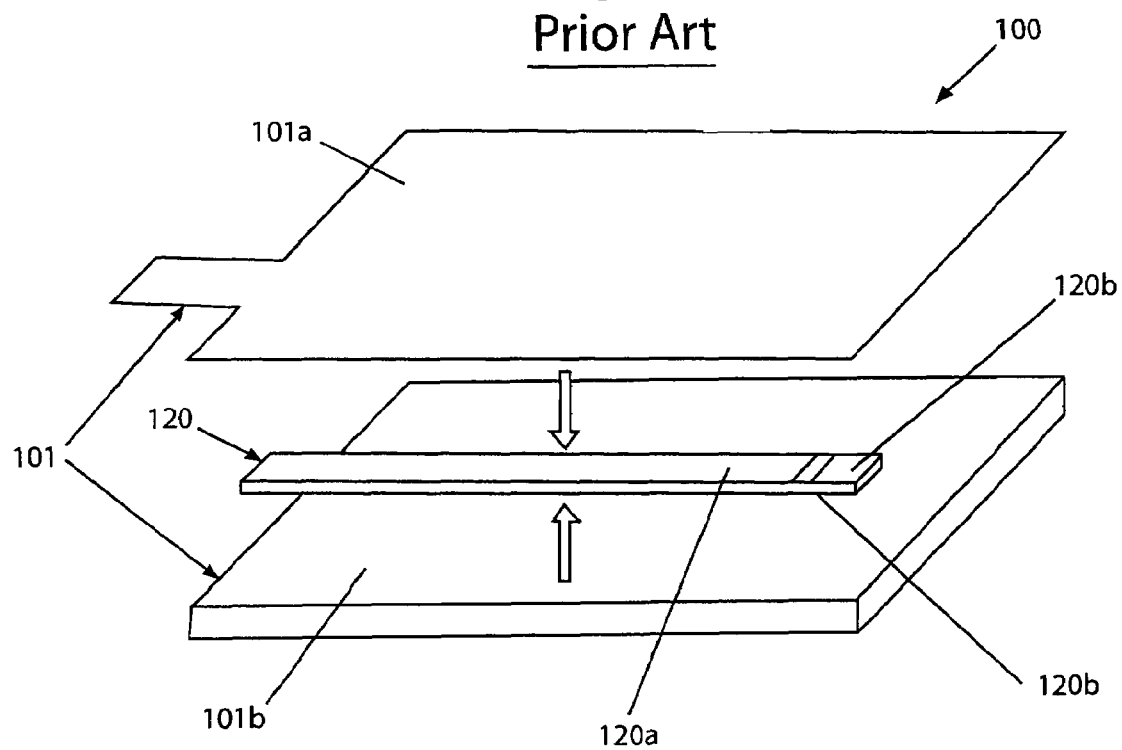
FIG. 11 is an exploded perspective drawing showing the simplified structure of a conventional touch panel input device that uses a piezoelectric substrate.
Figure 12:
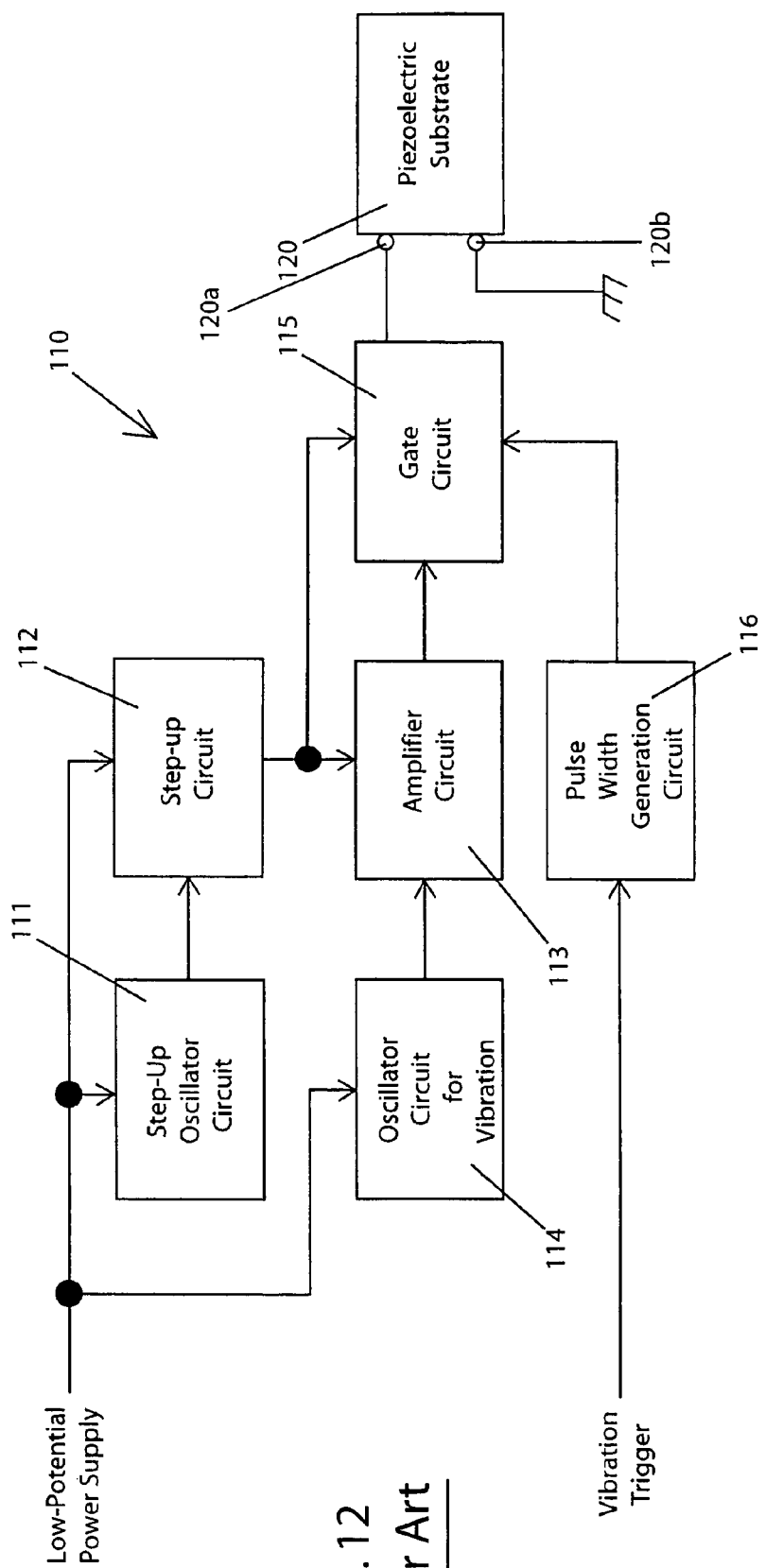
FIG. 12 is a block diagram of a conventional AC power supply circuit equipped with a step-up circuit.

Apart from obtaining a doubled potential in this manner, the switch SW5 and the switch SW6 of the selector switch 30 according to this embodiment can be switched independently with control signals from the port P0 and the port P1 so that the drive electrodes 13a, 13b of the piezoelectric substrate 13 can be easily shorted. More specifically, as shown in FIG. 9, during inactivity periods such as when the device is being shipped or when the touch panel input device 10 is not being used because the main power supply is turned off, the port P0 and the port P1 can both be set to "L" (see Table 1), so that the common terminal 22a of the switch SW5 can be connected to the selector terminal 23 and the common terminal 22b of the switch SW6 can be connected to the selector terminal 24b.

As a result, the drive electrodes 13a, 13b of the piezoelectric substrate 13 are connected to the output terminal 20b of the common ground side by way of the selector terminals 23b, 24b. Thus, when the device is not active, the drive electrodes 13a, 13b of the piezoelectric substrate 13 can be shorted and degradation of the piezoelectric substrate 13 caused by unintentional flow of DC between the drive electrodes 13a, 13b can be prevented.

When the device is not active, it is also possible to have the common terminal 22a and the common terminal 22b connected to the piezoelectric substrate 13 both connected to the selector terminals 23a, 24a on the high-potential side, and the drive electrodes 13a, 13b shorted.

In the embodiments described above, the AC power supply circuits 15, 20 are used to generate desired potential waveforms, but it is also possible to use other AC power supply circuits as long as AC waveform drive potentials can be generated.

The present invention is suited for touch panel input devices wherein a touch panel is vibrated with a piezoelectric substrate used as a vibration source.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A touch panel input device comprising:
   an input detector detecting an input operation to a touch panel;
   a piezoelectric substrate including a plurality of drive electrodes;
   an AC power supply circuit generating a drive potential with a predetermined waveform between a plurality of output terminals; and
   a selector switch allowing said drive electrodes of said piezoelectric substrate to be connected to and disconnected from said output terminals of said AC power supply circuit; wherein:
   when said input operation is detected within an operations area of said touch panel, said selector switch connects at least one of said drive electrodes of said piezoelectric substrate to at least one of said output terminals so that there is a connection between said drive electrodes and said output terminals,
   said touch panel is vibrated by said piezoelectric substrate, which expands and contracts in response to said drive potential applied between said drive electrodes, thus adapted to provide an input operation sensation to an operator; and
   when said touch panel input device is not operating, said selector switch substantially at the same time shorts said drive electrodes of said piezoelectric substrate and disconnects at least one of the drive electrodes of said piezoelectric from an output terminal of said AC power supply circuit.

2. A touch panel input device as described in claim 1, wherein:
   when said input operation is selected within said operations area of said touch panel, said selector switch alternately switches connections between said output terminals of said AC power supply circuit and said drive electrodes of said piezoelectric substrate near where a drive potential is at zero volts, and a potential that is double said drive potential generated by said AC power supply circuit is sent to said drive electrodes; and
   when said touch panel input device is not operating, said drive electrodes are disconnected from at least one of said output terminals.

* * * * *